(12) United States Patent
Ozawa

(10) Patent No.: US 7,626,743 B2
(45) Date of Patent: Dec. 1, 2009

(54) IMAGE PROCESSING APPARATUS, IMAGE PROCESSING METHOD AND IMAGE PROCESSING PROGRAM FOR RENDERING PIXELS TRANSPARENT IN CIRCUMSCRIBED AREAS

(75) Inventor: Masahiro Ozawa, Machida (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 844 days.

(21) Appl. No.: 10/315,189

(22) Filed: Dec. 10, 2002

(65) Prior Publication Data

US 2003/0107781 A1 Jun. 12, 2003

(30) Foreign Application Priority Data

Dec. 11, 2001 (JP) .............................. 2001-377851

(51) Int. Cl.
H04N 1/46 (2006.01)
(52) U.S. Cl. .................. 358/538; 358/450; 358/2.1; 358/1.18; 382/284; 382/173; 382/243; 382/190; 382/212; 345/592
(58) Field of Classification Search ............... 358/538, 358/450, 2.1, 1.18; 382/284, 173, 243, 190, 382/212, 213, 239, 180, 175, 176, 178; 345/592
See application file for complete search history.

(56) References Cited

U.S. PATENT DOCUMENTS

| | | | | |
|---|---|---|---|---|
| 5,638,498 A | * | 6/1997 | Tyler et al. ................. | 358/1.18 |
| 5,752,057 A | * | 5/1998 | Lifshitz et al. .............. | 715/523 |
| 5,767,978 A | * | 6/1998 | Revankar et al. ............ | 358/296 |
| 5,838,837 A | * | 11/1998 | Hirosawa et al. ............ | 382/284 |
| 5,982,937 A | * | 11/1999 | Accad ........................ | 382/239 |
| 5,991,515 A | * | 11/1999 | Fall et al. ................... | 358/1.15 |
| 6,055,064 A | * | 4/2000 | Lifshitz et al. .............. | 358/1.9 |
| 6,084,984 A | * | 7/2000 | Ishikawa ..................... | 382/173 |
| 6,230,174 B1 | * | 5/2001 | Berger et al. ................ | 715/513 |
| 6,262,746 B1 | * | 7/2001 | Collins ....................... | 345/629 |
| 6,333,752 B1 | * | 12/2001 | Hasegawa et al. ........... | 715/764 |

(Continued)

FOREIGN PATENT DOCUMENTS

JP 7-274067 10/1995

OTHER PUBLICATIONS

Richardo L. Queiroz, "Compression of Compound Documents", 0-7803-5467/99, 1999 IEEE.*

(Continued)

*Primary Examiner*—Twyler L Haskins
*Assistant Examiner*—Jacky X Zheng
(74) *Attorney, Agent, or Firm*—Buchanan Ingersoll & Rooney PC

(57) ABSTRACT

An improved image processing technology capable of obtaining a synthesized image file having high reproducibility without causing missing image parts due to partial or complete overlap among extracted areas when a document image file is created via synthesis of character, graphic and photograph areas that have been extracted from image data obtained via reading of an original document and that have been subjected to image processing. According to this image processing technology, circumscribed rectangular areas for each effective image area of image data is extracted while complementing pixels other than pixels comprising the effective image area using prescribed complementary pixels, and the complementary pixels for the extracted areas are rendered transparent.

25 Claims, 7 Drawing Sheets

U.S. PATENT DOCUMENTS

| | | | |
|---|---|---|---|
| 6,424,752 B1 * | 7/2002 | Katayama et al. | 382/284 |
| 6,639,692 B1 * | 10/2003 | Li et al. | 358/2.1 |
| 6,650,439 B1 * | 11/2003 | Nagarajan et al. | 358/2.1 |
| 6,882,444 B1 * | 4/2005 | Nishi | 358/1.9 |
| 6,898,316 B2 * | 5/2005 | Zhou | 382/190 |
| 6,999,620 B1 * | 2/2006 | Harville | 382/173 |
| 2002/0054112 A1 * | 5/2002 | Hasegawa et al. | 345/764 |

OTHER PUBLICATIONS

ITU-T (Telecommunication Standardization Sector of ITU) T.44, "Mixed Raster Content (MRC)", ITU-T Study Group 8, Apr. 1999.*

* cited by examiner

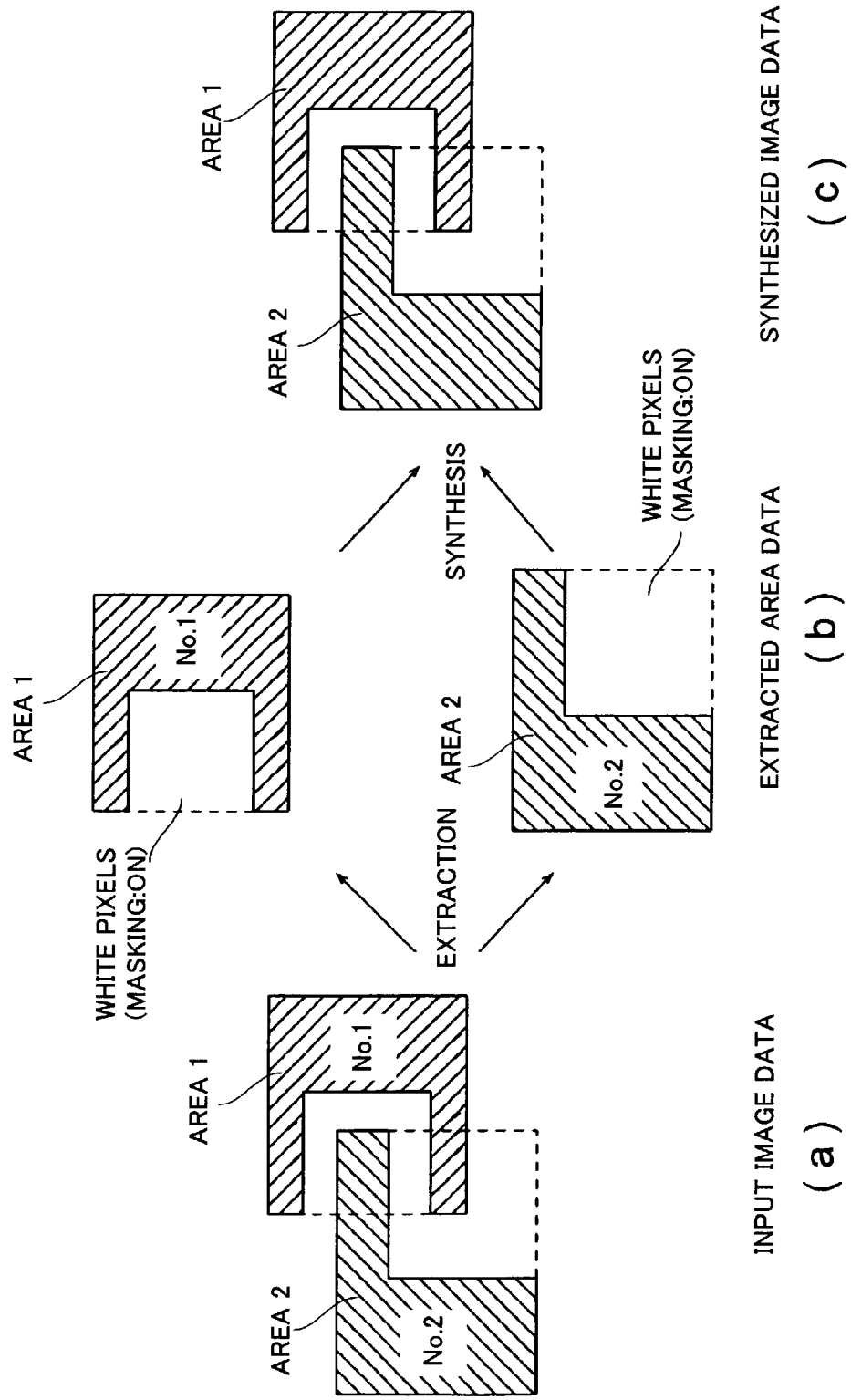

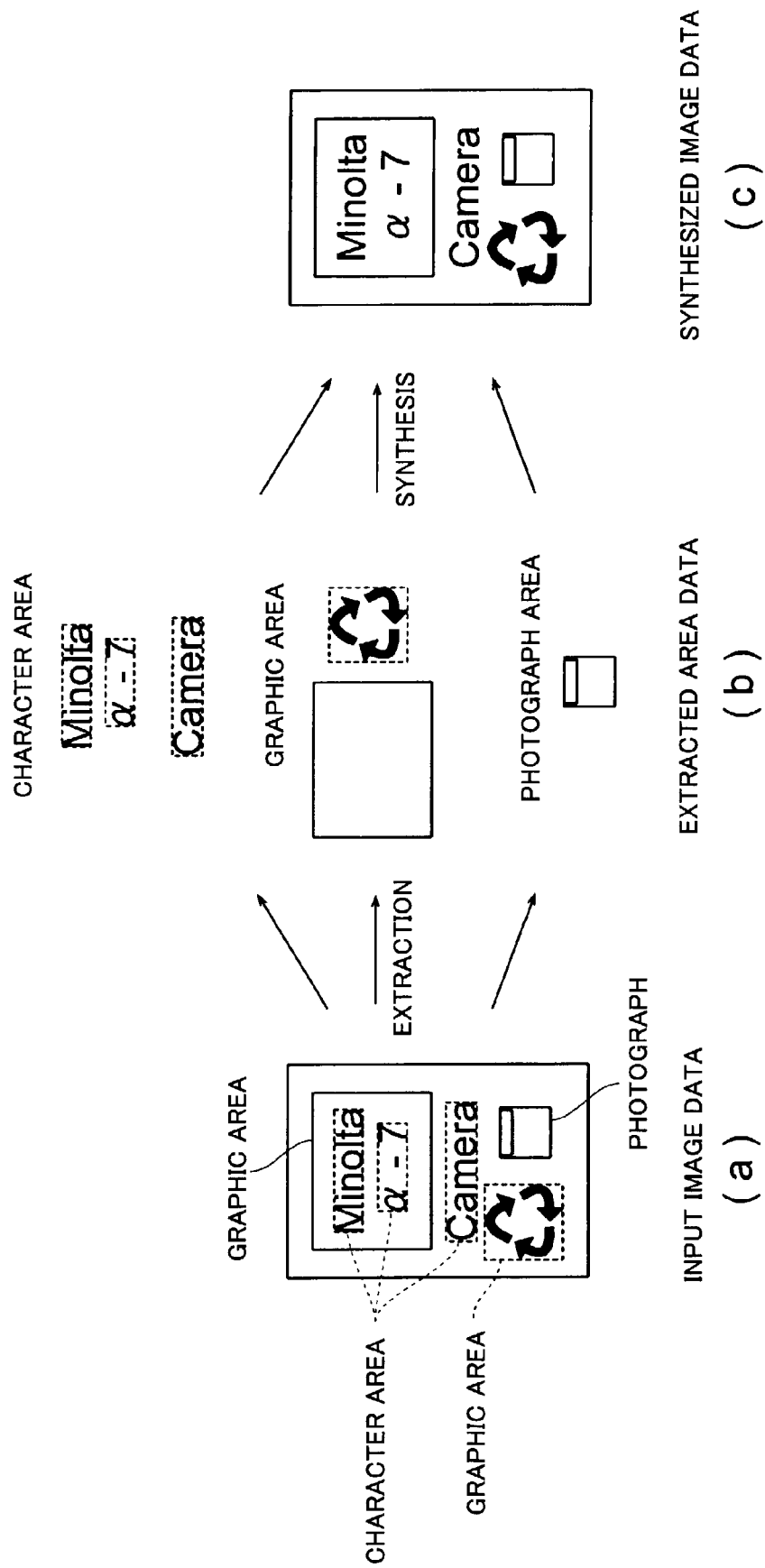

IMAGE PROCESSING APPARATUS, IMAGE PROCESSING METHOD AND IMAGE PROCESSING PROGRAM FOR RENDERING PIXELS TRANSPARENT IN CIRCUMSCRIBED AREAS

This application is based on Japanese Patent Application No. 2001-377851 filed in Japan on Dec. 11, 2001, the entire content of which is hereby incorporated by reference.

BACKGROUND OF THE INVENTION

1. Field of the Invention

The present invention relates to an image processing apparatus, image processing method and image processing program, and more particularly, to an image processing apparatus, image processing method and image processing program that synthesize into a document image file character, graphic and photograph areas that have been respectively extracted from image data obtained via reading of an original document and that have been subjected to image processing.

2. Description of Related Art

Image data obtained via reading of an original document using a scanner or other device is large in size and is not appropriate for storage or for transmission and receipt as is. The image data therefore is subjected to appropriate image processing, such as compression, depending on the type of the image. However, because image data that is obtained via reading of an original document includes character areas comprising character images, graphic areas comprising graphic images and photograph areas comprising photograph images, the problem exists that when the image data is subjected to irreversible compression appropriate for the photograph areas, although the data size is reduced, the characters become difficult to read, while if the image data is subjected to compression appropriate for the character areas, the compression ratio becomes small. Accordingly, an image processing apparatus is known that, after separately extracting character, graphic and photograph areas from image data obtained from an original document and performing compression appropriate for each type of area, creates a document image file by synthesizing these post-processing areas. Using this image processing apparatus, the size of the image file can be reduced while maintaining image quality.

However, the problem then arises that because the extraction of the various areas by the image processing apparatus described above is generally performed based on circumscribed rectangles for each area in order to avoid complex processing, some of the extracted areas partially or completely overlap, depending on the locations of the areas, resulting in missing image parts and thus in failure of the synthesized image file to reproduce the original.

OBJECT AND SUMMARY

An object of the present invention is to provide an improved image processing apparatus, improved image processing method and improved image processing program that resolve the problems identified above.

Another object of the present invention is to provide an image processing apparatus, image processing method and image processing program by which a synthesized image file having high reproducibility is obtained without causing missing image parts due to partial or complete overlap among extracted areas when a document image file is created via synthesis of character, graphic and photograph areas that have been extracted from image data obtained via reading of an original document and that have been subjected to image processing.

These objects are attained by providing an image processing apparatus including:

extracting means that extracts circumscribed rectangular areas for each effective image area of image data while supplementing pixels other than the pixels comprising the effective image area using prescribed supplementary pixels; and transparency processing means that renders transparent the supplementary pixels for the extracted areas extracted by the extracting means.

The image processing apparatus described above may further include a labeling means that labels the pixels comprising the effective image areas under prescribed conditions, and the extracting means may extract the circumscribed rectangular area for the pixels having a common label.

The image processing apparatus described above may further include first determining means that determines whether or not an extracted area partially or completely overlaps with another extracted area, and the transparency processing means may render the supplementary pixels transparent when there is a partial or complete overlap between the extracted area and another extracted area.

The image processing apparatus described above may further include second determining means that determines the type of each extracted area.

The image processing apparatus described above may further include image processing means that performs image processing in accordance with the type of each extracted area and image file creating means that creates an image file by synthesizing the extracted areas.

BRIEF DESCRIPTION OF THE DRAWINGS

These and other objects and features of the present invention will become clear from the following description taken in conjunction with the preferred embodiments thereof with reference to the accompanying drawings, in which:

FIG. 7 is a conceptual drawing showing one example of the area extraction and synthesis processes executed by the image processing apparatus 1; and FIG. 8 is a conceptual drawing showing another example of the image processing routine executed by the image processing apparatus 1.

DETAILED DESCRIPTION OF THE PREFERRED EMBODIMENTS

An embodiment of the present invention is described in detail below with reference to the drawings.

Figure 1:
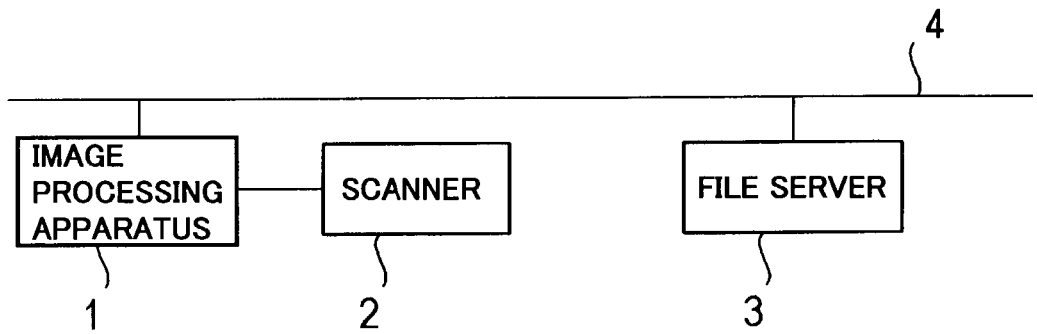
FIG. 1 is a block diagram showing the overall construction of an image processing system including an image processing apparatus 1 pertaining to an embodiment of the present invention.

FIG. 1 is a block diagram showing the overall construction of an image processing system including an image processing apparatus pertaining to an embodiment of the present invention. This image processing system includes an image processing apparatus 1, a scanner 2 that functions as an image input device, and a file server 3 that functions as an image output recipient device, and these apparatuses are data-communicably interconnected via a computer network 4. The types and number of the apparatuses connected to the computer network are not limited to the example shown in FIG. 1.

Figure 2:
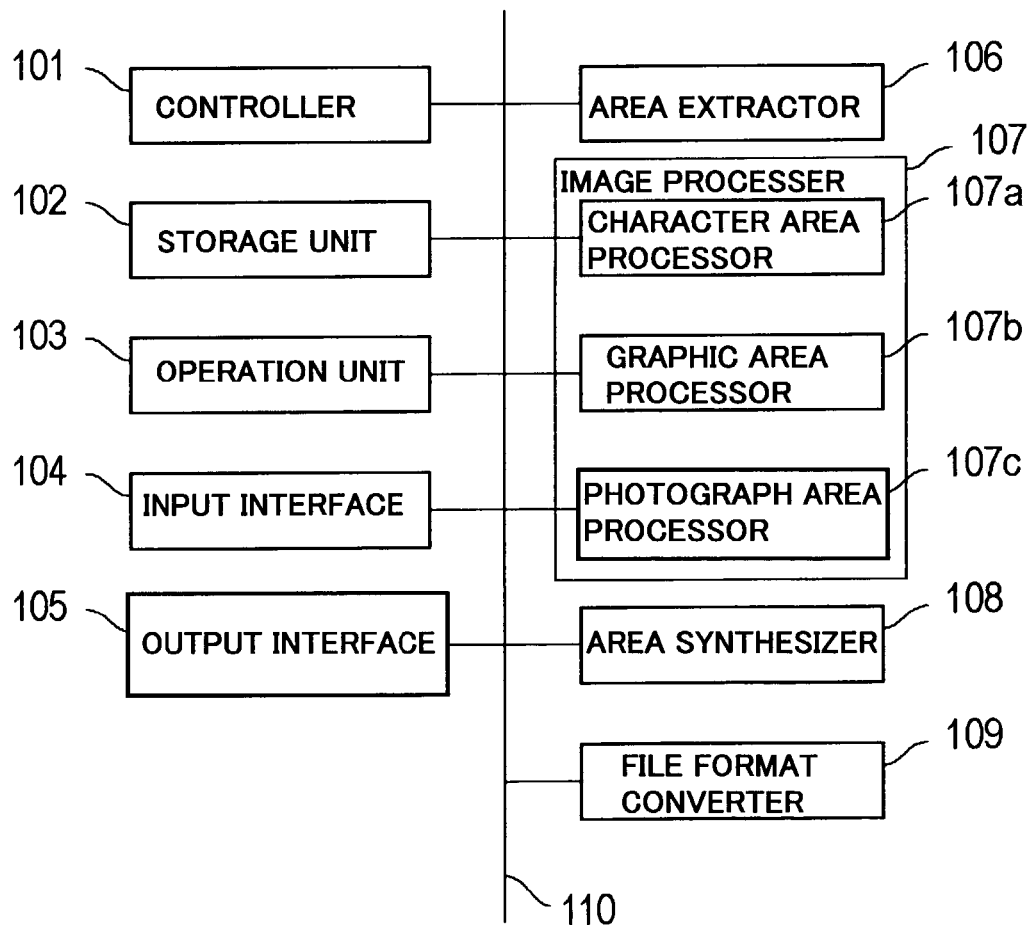
FIG. 2 is a block diagram showing the construction of the image processing apparatus 1 shown in FIG. 1.

FIG. 2 is a block diagram showing the construction of the image processing apparatus 1 pertaining to this embodiment. With reference to FIG. 2, the image processing apparatus 1 includes a controller 101, a storage unit 102, an operation unit 103, an input interface 104, an output interface 105, an area extractor 106, an image processor 107, an area synthesizer 108 and a file format converter 109, which are interconnected via a bus 110 such that signals can be transmitted and received among them.

The controller 101 comprises a CPU, and performs control of the various components described above as well as various types of calculations in accordance with programs. The storage unit 102 comprises a ROM in which various programs and parameters are stored in advance, a RAM that serves as a work area and temporarily stores programs and data, and a hard disk that is used to store various programs and parameters or to temporarily store image data or the like obtained via image processing, as well as other storage devices.

The operation unit 103 comprises keys, an operation panel or the like by which to specify the output area, the type of image processing, the color mode, the output file format, the transmission recipient, etc. and to give a command to start an operation. In this embodiment, an output area is specified by selecting the extracted character, graphic and photograph area or areas to be output. The type of image processing is specified by selecting whether or not to perform binarization, color reduction, resolution conversion, smoothing, compression, etc. with regard to the extracted area. A color mode is specified by selecting color, monochrome or gray scale for the output file. An output file format is specified by selecting a file format for the output file. Output file format options include the native document formats for various document creation software programs, as well as multi-purpose formats such as PostScript™, PDF, JPEG and TIFF. A transmission recipient is specified by inputting the IP address, host name, e-mail address or the like of the image output recipient device.

The input interface 104 is an interface by which to receive input of image data from an external image input device, and the output interface 105 is an interface by which to send an output file to an external image output recipient device.

The area extractor 106 performs processing to separately extract character areas, graphic areas and photograph areas from the input image data. The image processor 107 comprises a character area processor 107a, a graphic area processor 107b, and a photograph area processor 107c, which respectively perform image processing appropriate for the image data pertaining to the extracted character, graphic and photograph areas. The area synthesizer 108 synthesizes the character, graphic and photograph areas obtained after image processing to create a document image file in accordance with the internal file format. The file format converter 109 converts the document image file created in accordance with the internal file format into the specified output file format.

The scanner 2 obtains image data by reading an original document, and sends the image data thus obtained to the image processing apparatus.

The file server 3 is a computer. It stores files received over the computer network, and forwards a file stored therein to another apparatus on the computer network in response to a forward request.

The computer network 4 comprises a LAN connecting computers and peripheral devices, network devices and the like using a standard such as Ethernet™, token ring or FDDI, a WAN comprising LANs connected using dedicated cables, or other type of network.

Figure 3:
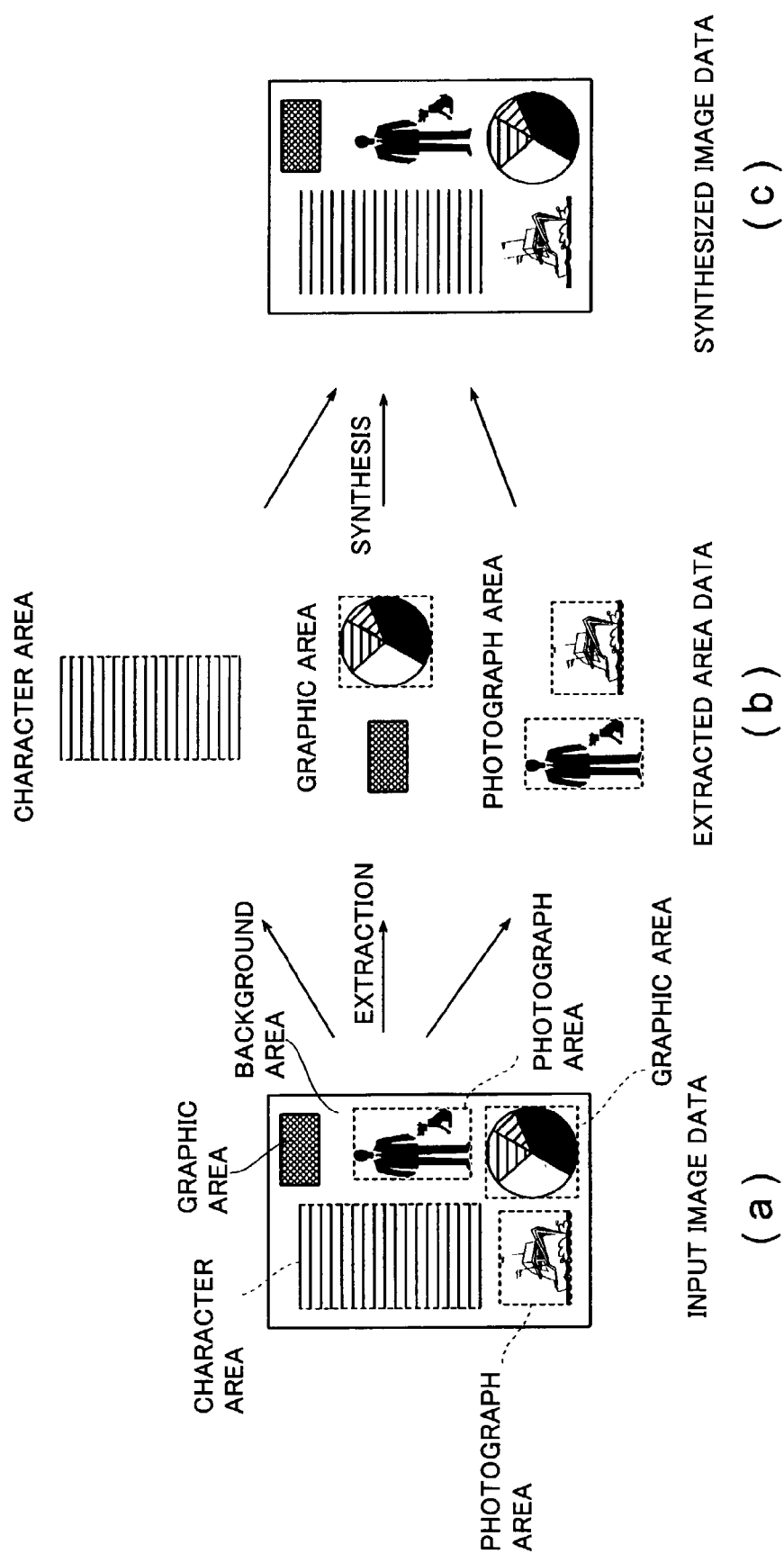
FIG. 3 is a conceptual drawing showing one example of the image processing executed by the image processing apparatus 1.

The basic sequence of the image processing performed by the image processing apparatus 1 pertaining to this embodiment will now be explained. FIG. 3 is a conceptual drawing showing one example of the image processing performed by the image processing apparatus 1. As shown in FIG. 3(a), the image data obtained via reading of an original document by the scanner 2 includes character areas comprising character images, graphic areas comprising graphic images, photograph areas comprising photograph images and a background area comprising background images (in this specification, the image data for areas other than the background area, i.e., the character areas, graphic areas and photograph areas of the document image data, will hereinafter be referred to as 'effective image areas'). Where such large-size image data is to be compressed to reduce the data size for storage in the file server 3, if image processing such as compression is performed uniformly with regard to the entire image data, i.e., if the image data is subjected to irreversible compression appropriate for the photograph areas, for example, although the data size is reduced, the characters become difficult to read due to image deterioration, while if it is subjected to compression appropriate for the character areas, the compression ratio becomes small. Accordingly, the image processing apparatus 1 separately extracts character areas, graphic areas and photograph areas from the input image data received from the scanner 2 (FIG. 3(b)), creates synthesized image data by synthesizing such areas after subjecting the image data of each extracted area to image processing appropriate for the type of extracted area (FIG. 3(c)), and converts the synthesized image data into a prescribed file format for transmission to the file server 3.

In one method for extracting areas from the input image data, the pixels comprising effective image areas of the input image data are labeled under prescribed conditions, and areas are extracted by extracting groups of pixels having a common label. In other words, a group of pixels comprising one effective image area (such as one graphic area) of the input image data is labeled using a common labeling number, and at the same time, the location information regarding the circumscribed rectangular area for this group of pixels is detected. Based on the location information regarding the circumscribed rectangle and the labeling number, the circumscribed rectangular area for such effective image area is extracted from the input image data. When this is done, by extracting only pixels having a common labeling number as the labeling number for the pixels within the target circumscribed rectangle from the input image data, and by supplementing other pixels within the circumscribed rectangle using prescribed supplementary pixels (such as white pixels, which are the most common background pixels, for example), even if the image data has a layout such that the circumscribed rectangles for each effective image area partially or completely overlap, each area can be completely separated and extracted.

The effective image areas are extracted as circumscribed rectangular areas in order to avoid complex processing, enabling a reduction in both the burden and time entailed by the processing, and the pixels other than the extracted pixels within the circumscribed rectangular area are supplemented using supplementary pixels such as white pixels in order to prevent redundant extraction of the same image. However, where the image data has a layout in which circumscribed rectangles for the effective image areas partially or completely overlap, as described above, the problem exists that if the extracted area data obtained through labeling is to be synthesized after image processing, the extracted areas partially or completely overlap, resulting in missing image parts.

Figure 4:
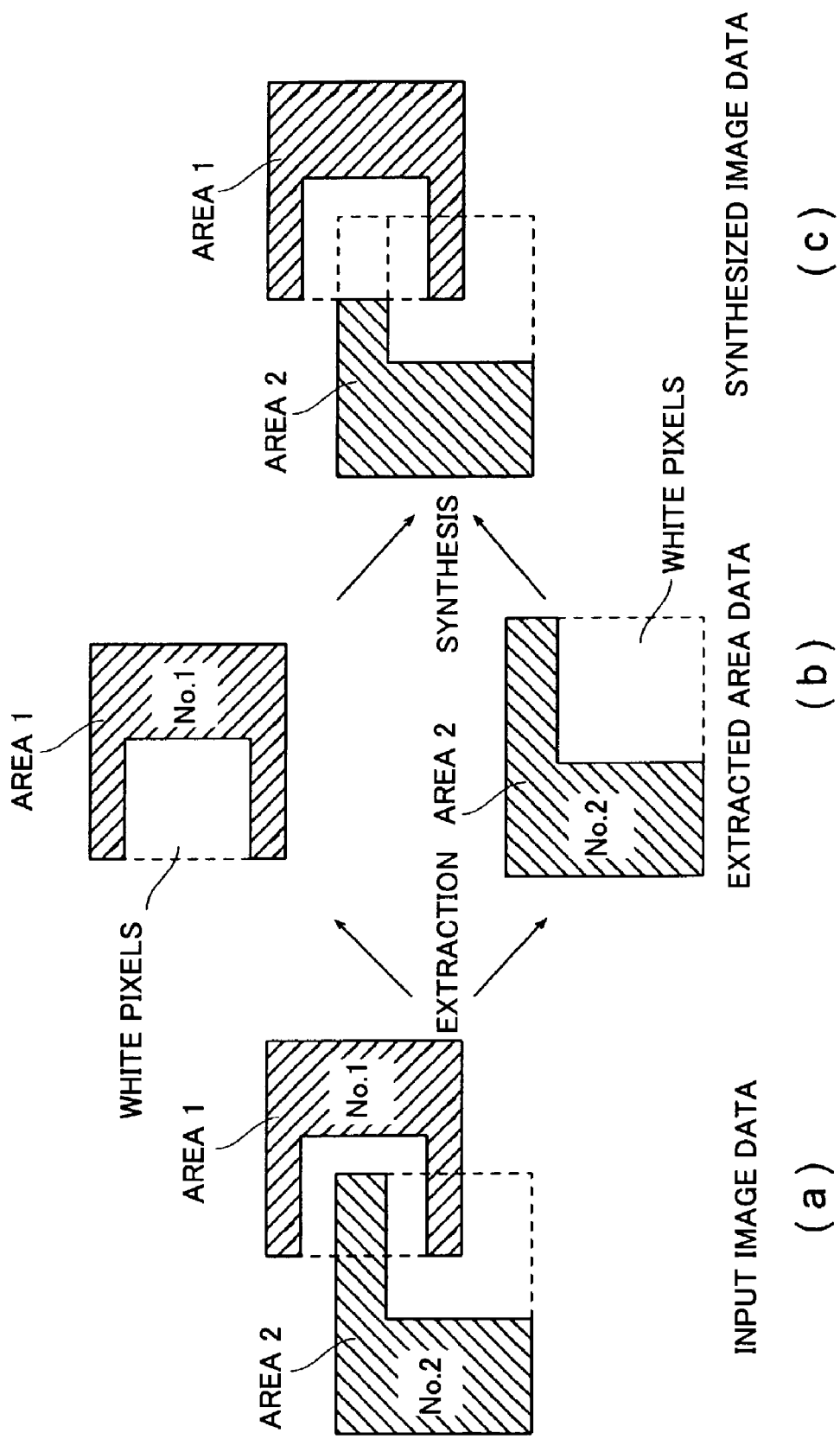
FIG. 4 is a conceptual drawing showing one example of the area extraction and synthesis processes executed using the labeling technique of the conventional art.

FIG. 4 is a conceptual drawing showing one example of the area extraction and synthesis processes using the labeling technique of the conventional art. In FIG. 4(a), the pixels in the area 1 and area 2, which are effective image areas pertaining to the input image data, are labeled with a labeling number 1 and a labeling number 2, respectively. In FIG. 4(b), during extraction of the circumscribed rectangular area for the area 1, the pixels having the labeling number 1 and located within the circumscribed rectangle for the area 1 are extracted, and the other pixels in the same circumscribed rectangle are supplemented using white pixels to obtain extracted area data. Similarly, during extraction of the circumscribed rectangular area for the area 2, the pixels having the labeling number 2 and located within the circumscribed rectangle for the area 2 are extracted, and the other pixels in the same circumscribed rectangle are supplemented using white pixels to obtain extracted area data. If synthesized image data is to be obtained by synthesizing the extracted areas based on their respective location information after each set of extracted data for the areas 1 and 2 is subjected to appropriate image processing, respectively, as shown in FIG. 4(c), because the circumscribed rectangles for the areas 1 and 2 partially overlap, regardless of which of the extracted areas is placed on top, a part of the effective image area of one of the extracted areas becomes hidden by the white pixels of the other extracted area, resulting in a missing image part. In this embodiment, the image processing apparatus 1 resolves this problem by determining the existence of a partial or complete overlap between circumscribed rectangles for each effective image area when extracting such effective image areas from image data, and by performing masking (transparency processing) of the white pixels of the extracted areas if their circumscribed rectangles have a partial or complete overlap, thereby attaining high-ratio compression while reducing image quality deterioration, and ensuring that the synthesized image data has high reproducibility and no missing image parts.

The basic sequence of the operations of the image processing system of this embodiment will now be explained.

Figure 5:
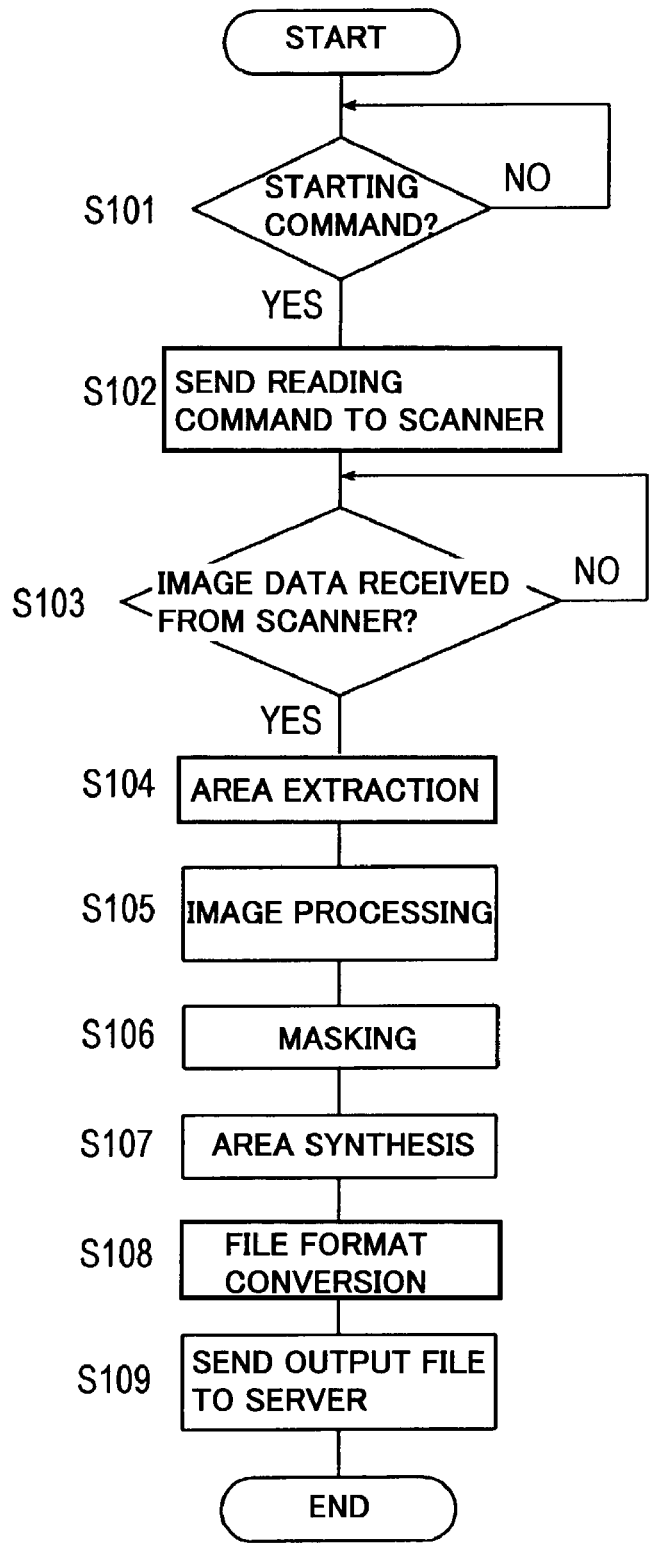
FIG. 5 is a flow chart showing the sequence of the image processing executed by the image processing apparatus 1.

FIG. 5 is a flow chart showing the sequence of the image processing performed by the image processing apparatus 1 pertaining to this embodiment. This image processing is executed by the controller 1 (CPU) in accordance with a computer program stored in the storage unit 2 (such as a ROM, for example).

With reference to FIG. 5, the image processing apparatus 1 stands by until it receives a command to start image processing (NO in S101). When it receives input of a start command from the user via the operation unit 103 (YES in S101), a command to read the original document is sent to the scanner 2 via the input interface 104 (S102), and the image processing apparatus 1 stands by until image data is received from the scanner 2 (NO in S103). When a command to read the original document is received from the image processing apparatus 1, the scanner 2 reads the original document that is placed at a prescribed position and obtains image data pertaining thereto, which is then sent to the image processing apparatus 1. The command to start image processing may be input from a different apparatus in the communication network 4 or input directly from the scanner 2, and in this case, steps S101 and S102 are omitted.

When the image data is received from the scanner 2 via the input interface 104 (YES in S103), the image processing apparatus 1 stores the received image data in the storage unit 102, and performs an area extraction process regarding the input image data using the area extractor 106 (S104).

Figure 6:
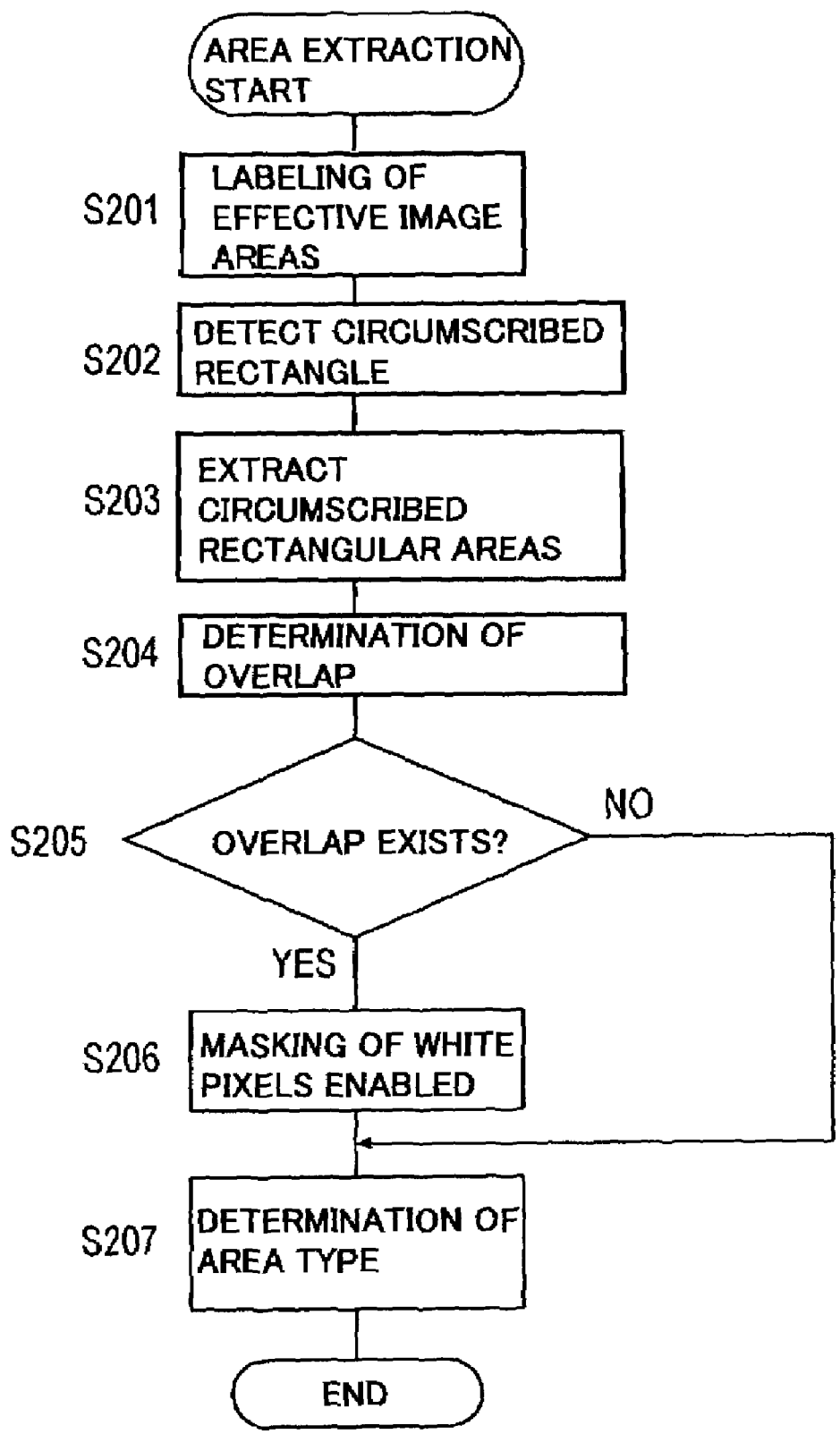
FIG. 6 is a flow chart showing the sequence of the area extraction process executed by the image processing apparatus 1.

FIG. 6 is a flow chart showing the sequence of the area extraction process performed by the image processing apparatus 1 pertaining to this embodiment. With reference to FIG. 6, the image processing apparatus 1 performs labeling with respect to the pixels comprising effective image areas under prescribed conditions, detects the location information regarding the circumscribed rectangles for each group of pixels at the same time, and stores the labeled image data thus obtained in the storage unit 102 (S201 and S202). The method of labeling is not limited to any specific method, and any public-known method can be used. In one example, brightness image data is created from the input image data (RGB image data), and after the removal of background and filter smoothing, the image data is subjected to simple binarization based on the background level to create binary image data that integrates areas other than the background. The binary image data thus obtained is then subjected to Laplacian filtering to detect edges, and a closing process is performed in order to supplement the edges, whereupon edge image data is obtained. The edge image thus obtained is equivalent to the contour lines of the effective image areas. By performing labeling such that a common labeling number is assigned to the pixels in each area separated in the edge image, labeled image data is created.

Based on the location information and the labeling numbers regarding the circumscribed rectangles and the labeled pixels in the labeled image data, circumscribed rectangular areas for effective image areas are extracted from the input image data (S203). When this is done, only pixels having the same labeling number as the pixels within each target circumscribed rectangular area are extracted from the input image data, and other pixels in each rectangular area are supplemented using white pixels, whereupon extracted area data is obtained and stored in the storage unit 102. Location information regarding the circumscribed rectangles for each extracted area are then compared to determine if a partial or complete overlap exists between circumscribed rectangles (S204), and where the circumscribed rectangle for an extracted area partially or completely overlaps with the circumscribed rectangle for another extracted area, masking of the white pixels of the first extracted area is enabled (S205 and S206). The ON/OFF setting for masking is included in the attribute information for each pixel as a condition governing the determination as to whether the masking process (transparency processing) described below is to be executed, and the default setting is OFF.

The characteristic amount of the thus obtained extracted area data is calculated to determine the type of each extracted area, i.e., to determine whether the area is a character area, a graphic area or a photograph area, and this information is recorded as attribute information for the extracted area (S207). The method of determination of the area type is not limited to any specific method, and any public-domain method can be used. In one example, in order to distinguish a graphic area from a photograph area, based on the characteristic that the brightness distribution in a graphic area is relatively uniform and the brightness distribution in a photograph area is dispersed, the degree of brightness distribution is calculated as a characteristic amount using brightness image data, i.e., by creating brightness histograms for each line in both the main and secondary scanning directions with regard to all pixels within the extracted area, and the extracted area is determined to be a graphic area or a photograph area. Furthermore, based on the characteristic that a character area contains many diagonal edge components in a small area, using the input image data, the diagonal edge components of the frequency components contained in the extracted area are calculated as a characteristic amount, and an extracted area is determined to be a character area based on the ratio of diagonal edge components contained therein.

With reference to FIG. 5, the image processing apparatus 1 performs image processing corresponding to the area type for the extracted area data obtained in step S104 using the image processor 107 (S105). In other words, the character area processor 107a binarizes the obtained character area data, performs 1-bit data irreversible compression such as MH compression, MR compression, MMR compression, JBIG compression or Flate compression, and stores the post-processing image data in the storage unit 102 together with the color information and location information. The graphic area processor 107b performs such processing as smoothing, color reduction and resolution conversion regarding the obtained graphic area data, as well as Flate compression if reversible compression is used or JPEG compression if irreversible compression is used, and stores the post-processing image data in the storage unit 102 together with the location information. The photograph area processor 107c performs resolution conversion, smoothing, etc. regarding the obtained photograph area data, and after further performing irreversible compression such as JPEG compression, stores the post-processing image data in the storage unit 102 together with the location information.

The area synthesizer 108 then refers to the attribute information for the pixels comprising each obtained extracted area, and performs masking regarding pixels for which masking is enabled (S106). 'Masking' means transparency processing in which a target pixel is assigned an attribute by virtue of which the pixel located behind such pixel is enabled instead of the target pixel. Through this processing, the white pixels of an extracted area having a circumscribed rectangle that partially or completely overlaps with another circumscribed rectangle are made transparent. Each extracted area is then synthesized based on the location information pertaining thereto in order to create document image data (S107). The file format converter 109 then converts the document image data thus obtained into a specified output file format (S108). The output file thus obtained (document image file) is sent to the file server 3 via the output interface 105 and over the computer network 4 (S109).

Upon receiving the output file from the image processing apparatus 1 over the computer network 4, the file server 3 develops the character image data and the graphic image data from the received file. The character image data is subjected to a character recognition process and converted into character code data, and the graphic image data is subjected to a vector conversion process and converted into vector data. Each set of post-conversion data is synthesized with the photograph image data. The synthesized data is converted into a prescribed file format, and the document file thus obtained is stored in a prescribed directory of the storage device comprising a hard disk or the like. When a request to forward this file is received from another apparatus on the computer network 4, the file server 3 sends the file stored therein to the other apparatus over the computer network 4.

FIG. 7 is a conceptual drawing showing one example of the area extraction and synthesis processes performed by the image processing apparatus 1. In FIG. 7(a), the pixels in the areas 1 and 2, which are effective image areas pertaining to the input image data, are labeled by the image processing apparatus 1 with a labeling number 1 and a labeling number 2, respectively. In FIG. 7(b), the pixels labeled with the labeling number 1 and located within the circumscribed rectangle for the area 1 are extracted, and the other pixels in the same circumscribed rectangle are supplemented using white pixels to obtain extracted area data. Similarly, the pixels labeled with the labeling number 2 and located within the circumscribed rectangle for the area 2 are extracted, and the other pixels in the same circumscribed rectangle are supplemented using white pixels to obtain extracted area data. Because the circumscribed rectangles for the areas 1 and 2 partially overlap, masking is enabled for the white pixels of the extracted data for the areas 1 and 2. In FIG. 7(c), the extracted areas are synthesized based on the location information pertaining thereto in order to obtain synthesized image data. When this is done, because the white pixels of the extracted data for the areas 1 and 2 for which masking is enabled are made transparent, regardless which of the extracted areas is placed on top, the effective image areas for both the areas 1 and 2 are not hidden, offering synthesized image data having high reproducibility and no missing image parts.

FIG. 8 is a conceptual drawing showing another example of the image processing performed by the image processing apparatus 1. According to the image processing apparatus 1 of this embodiment, even in the case of image data having a layout in which effective image areas completely overlap, such as when character images exist on a graphic image (FIG. 8(a)), the character images and the graphic image can be completely separated and extracted from the input image data (FIG. 8(b)), and when the sets of extracted area data are overlapped and synthesized after being subjected to appropriate image processing, because the white pixels within each circumscribed rectangle are made transparent, missing image parts do not result either in the character images or the graphic image, and synthesized image data with high reproducibility can be obtained (FIG. 8(c)).

Although the present invention has been fully described in connection with the preferred embodiments thereof with reference to the accompanying drawings, it is to be noted that various changes and modifications are apparent to those skilled in the art. Such changes and modification are to be understood as included within the scope of the present invention as defined by the appended claims unless they depart therefrom.

In the embodiment described above, pixels having the color 'white', which is a common background color, were used as the supplementary pixels when extracting circumscribed rectangular areas for effective image areas, but the present invention is not limited to this implementation. Pixels having the color of the actual background may be used as the supplementary pixels, for example.

In the embodiment described above, only the white pixels in extracted areas regarding which the respective circumscribed rectangles partially or completely overlap were made transparent, but white pixels of all extracted areas may be made transparent regardless whether their circumscribed rectangles overlap. Alternatively, the order of overlapping of the extracted areas during synthesis may be determined in advance, so that of the extracted areas having an overlapping circumscribed rectangle, only the white pixels of the extracted areas other than the extracted areas that are synthesized first (i.e., those that are located at the bottom) are made transparent.

In the embodiment described above, as examples, a scanner was used as the image input device and a file server was used as the image output recipient device in the image processing system pertaining to the present invention. However, the image input device and the image output recipient device are not limited to these types of apparatuses.

For example, a digital camera, facsimile machine, digital copying machine, multi-function peripheral (MFP), personal computer, workstation, server or the like can serve as the image input device.

Similarly, a facsimile machine, digital copying machine, personal computer, workstation, server or the like can serve as the image output recipient device.

Furthermore, the image processing apparatus of the present invention may be realized using an apparatus having image reading means such as a scanner, digital copying machine, facsimile machine or multi-function peripheral, or a computer such as a personal computer, workstation or server.

The image processing apparatus pertaining to the present invention may be realized by hardware circuits dedicated to execution of the sequences shown in the flow charts described above or through execution by the CPU of a program describing these sequences.

Where the present invention is realized using the latter option, the program that operates the image processing apparatus may be provided using a computer-readable recording medium such as a flexible disk or CD-ROM. Alternatively, the program that operates the image processing apparatus may be provided via online downloading over a network such as the Internet. In this case, the program recorded in the computer-readable recording medium is normally transferred to the ROM, hard disk or the like and stored therein. This program may be provided as a stand-alone application software program or may be integrated in the software contained in the image processing apparatus as one of the functions of such apparatus, for example.

As described above, according to the image processing apparatus, image processing method and image processing program of the present invention, when a document image file is created by extracting character, graphic and photograph areas from image data obtained via reading of an original document and synthesizing such areas after they are subjected to image processing, a synthesized image file having high reproducibility can be obtained without the occurrence of missing image parts caused due to overlapping of extracted areas, while maintaining image quality and ensuring a high compression ratio.

What is claimed is:

1. An image processing apparatus comprising:
   extracting means for extracting data from circumscribed rectangular areas for each effective image area of image data so that the extracted data can be processed separately, and for determining location information for the circumscribed rectangular areas, wherein the extracted data includes the image data for the effective image areas, while supplementing pixels in the circumscribed rectangular areas other than pixels comprising the effective image area using prescribed supplementary pixels that can be identified for transparency processing;
   transparency processing means for rendering transparent the supplementary pixels for the extracted areas after the extracting means extracts that circumscribed rectangular areas; and
   file creating means for creating a file by synthesizing the extracted areas based on the location information;
   wherein each of the supplementing pixels is assigned an attribute by virtue of which a pixel in the created file has a value of a pixel located behind the supplementary pixel.

2. The image processing apparatus according to claim 1, further comprising labeling means for labeling the pixels comprising the effective image areas under prescribed conditions, and wherein
   the extracting means extracts the circumscribed rectangular area for the pixels having a common label.

3. The image processing apparatus according to claim 1, further comprising first determining means for determining whether or not an extracted area partially or completely overlaps with another extracted area, and wherein
   the transparency processing means renders the supplementary pixels transparent when there is a partial or complete overlap between the extracted area and another extracted area.

4. The image processing apparatus according to claim 1, further comprising second determining means for determining the type of each extracted area.

5. The image processing apparatus according to claim 4, further comprising:
   image processing means for performing image processing in accordance with the type of each extracted area; and
   image file creating means for creating an image file by synthesizing the extracted areas.

6. The image processing apparatus according to claim 1, further comprising an image reader for reading an image of an original document to obtain image data thereof.

7. The image processing apparatus according to claim 1, wherein the image data is a scanned image.

8. The image processing apparatus according to claim 1, wherein the effective image areas are areas other than background areas.

9. An image processing apparatus according to claim 1, wherein the effective image areas are character areas, graphic areas, and photograph areas.

10. The method for processing images, comprising the steps of:
    1) extracting data from circumscribed rectangular areas for each effective image area of image data so that the extracted data can be processed separately, and determining location information for the circumscribed rectangular areas,
    wherein the extracted area includes the image data for the effective image areas, and supplementing pixels in the circumscribed rectangular areas other than pixels comprising the effective image area using prescribed supplementary pixels that can be identified for transparency processing;
    2) after extracting the circumscribed rectangular areas rendering transparent the supplementary pixels for the extracted areas extracted at 1);
    3) creating a file by synthesizing the extracted areas based on the location information; and
    4) the foregoing method steps are executed in an image processing apparatus;
    wherein each of the supplementary pixels is assigned an attribute by virtue of which a pixel in the created file has a value of a pixel located behind the supplementary pixel.

11. The method according to claim 10, further comprising 3) labeling the pixels comprising the effective image areas under prescribed conditions, and wherein the circumscribed rectangular area for the pixels having a common label is extracted at 1).

12. The method according to claim 10, further comprising 4) determining whether or not an extracted area partially or completely overlaps with another extracted area, and wherein at 2) the supplementary pixels are rendered transparent when there is a partial or complete overlap between the extracted area and another extracted area.

13. The method according to claim 10, further comprising 5) determining the type of each extracted area.

14. The method according to claim 13, further comprising:
6) performing image processing in accordance with the type of each extracted area; and
7) creating an image file by synthesizing the extracted areas.

15. The method according to claim 10, wherein the image data is a scanned image.

16. The method according to claim 10, wherein the effective image areas are areas other than background areas.

17. The method according to claim 10, wherein the effective image areas are character areas, graphic areas, and photograph areas.

18. A computer-readable medium encoded with a computer program, the program comprising instructions to cause a computer to execute:
1) extracting data from circumscribed rectangular areas for each effective image area of image data so that the extracted data can be processed separately, and determining location information for the circumscribed rectangular areas, wherein the extracted data includes the image data for the effective image areas, wherein the extracted area includes the image data for the effective image areas, and supplementing pixels in the circumscribed rectangular areas other than pixels comprising the effective image area using prescribed supplementary pixels that can be identified for transparency processing;
2) after extracting the circumscribed rectangular areas rendering transparent the supplementary pixels for the extracted areas extracted at 1);
creating a file by synthesizing the extracted areas based on the location information;

wherein each of the supplementary pixels is assigned an attribute by virtue of which a pixel in the created file has a value of a pixel located behind the supplementary pixel.

19. The computer-readable medium encoded with a computer program according to claim 18, wherein the instructions further include 3) labeling the pixels comprising the effective image areas under prescribed conditions, and wherein the circumscribed rectangular area for the pixels having a common label is extracted at 1).

20. The computer-readable medium encoded with a computer program according to claim 18, wherein the instructions further include 4) determining whether or not an extracted area partially or completely overlaps with another extracted area, and wherein at 2) the supplementary pixels are rendered transparent when there is a partial or complete overlap between the extracted area and another extracted area.

21. The computer-readable medium encoded with a computer program according to claim 18, wherein the instructions further include 5) determining the type of each extracted area.

22. The computer-readable medium encoded with a computer program according to claim 21, wherein the instructions further include:
6) performing image processing in accordance with the type of each extracted area; and
7) creating an image file by synthesizing the extracted areas.

23. The computer-readable medium encoded with a computer program according to claim 18, wherein the image data is a scanned image.

24. The computer-readable medium encoded with a computer program according to claim 18, wherein the effective image areas are areas other than background areas.

25. The computer-readable medium encoded with a computer program according to claim 18, wherein the effective image areas are character areas, graphic areas, and photograph areas.

* * * * *

UNITED STATES PATENT AND TRADEMARK OFFICE
CERTIFICATE OF CORRECTION

PATENT NO. : 7,626,743 B2
APPLICATION NO. : 10/315189
DATED : December 1, 2009
INVENTOR(S) : Masahiro Ozawa Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1133 days.

Signed and Sealed this

Second Day of November, 2010

David J. Kappos
*Director of the United States Patent and Trademark Office*